US011185018B2

(12) United States Patent
Fullerton

(10) Patent No.: US 11,185,018 B2
(45) Date of Patent: Nov. 30, 2021

(54) VINEYARD FRUIT PROTECTION APPARATUS AND PROCESS

(71) Applicant: Patricia C Fullerton, San Saba, TX (US)

(72) Inventor: Patricia C Fullerton, San Saba, TX (US)

(\*) Notice: Subject to any disclaimer, the term of this patent is extended or adjusted under 35 U.S.C. 154(b) by 52 days.

(21) Appl. No.: 16/666,897

(22) Filed: Oct. 29, 2019

(65) Prior Publication Data

US 2020/0128762 A1 Apr. 30, 2020

Related U.S. Application Data

(60) Provisional application No. 62/752,690, filed on Oct. 30, 2018.

(51) Int. Cl.
*A01G 13/04* (2006.01)
*A01G 13/10* (2006.01)
*A01G 17/04* (2006.01)

(52) U.S. Cl.
CPC .......... *A01G 13/043* (2013.01); *A01G 13/10* (2013.01); *A01G 17/04* (2013.01)

(58) Field of Classification Search
CPC .. A01G 13/0231; A01G 13/04; A01G 13/043; A01G 13/10; A01G 13/0268; A01G 17/02; A01G 17/04; A01M 29/32
USPC ............................................................ 47/31
See application file for complete search history.

(56) References Cited

U.S. PATENT DOCUMENTS

| | | | | |
|---|---|---|---|---|
| 614,921 A * | 11/1898 | Zimmerman | ........ | A01G 13/043 47/23.2 |
| 1,011,017 A * | 12/1911 | Bevill | ..................... | A01G 13/04 47/29.5 |
| 1,134,841 A * | 4/1915 | Gompf | .................... | A01G 13/04 47/29.5 |
| 1,446,416 A * | 2/1923 | Curtiss | .................... | A01G 13/04 47/23.2 |
| 1,988,886 A * | 1/1935 | Wilson | ............... | A01G 13/0237 47/84 |
| 2,618,102 A * | 11/1952 | Fitzpatrick | ............. | A01G 13/10 47/32.5 |
| 4,265,049 A * | 5/1981 | Gorewitz | ............. | A01G 13/043 47/29.1 |
| 4,969,555 A * | 11/1990 | Fitzgerald | .......... | A01G 13/0237 206/423 |
| 5,233,788 A * | 8/1993 | Jackson, Jr. | ....... | A01G 13/0237 47/31 |
| 5,359,810 A * | 11/1994 | Aul | .................... | A01G 13/0237 206/423 |

(Continued)

FOREIGN PATENT DOCUMENTS

| CA | 2044715 A1 * | 12/1992 | ........... A01G 13/043 |
|---|---|---|---|
| DE | 495913 C * | 4/1930 | ............. A01G 13/04 |

(Continued)

*Primary Examiner* — Peter M Poon
*Assistant Examiner* — Morgan T Barlow
(74) *Attorney, Agent, or Firm* — Steven R. Vosen

(57) ABSTRACT

A removable netting system includes a netting tunnel adapted to be placed surrounding the fruit along a row of multiple vines without touching the fruit, thus protecting vine fruit from destruction by birds. The netting tunnel includes a pair of nets joined along top and bottom edges and rings which maintain the netting tunnel along the row of multiple vines.

5 Claims, 4 Drawing Sheets
(2 of 4 Drawing Sheet(s) Filed in Color)

(56) References Cited

U.S. PATENT DOCUMENTS

| | | | | |
|---|---|---|---|---|
| 5,832,660 A * | 11/1998 | Posa | A01G 13/043 | 47/20.1 |
| 6,631,584 B1 * | 10/2003 | Seinsevin | A01G 13/0231 | 47/44 |
| 6,698,135 B1 * | 3/2004 | Robbins | A01G 13/043 | 47/23.3 |
| 7,637,053 B1 * | 12/2009 | McAnulty | A01G 13/043 | 47/23.1 |
| 7,941,966 B2 * | 5/2011 | Foix Robert | A01G 13/10 | 47/24.1 |
| 2001/0051240 A1 * | 12/2001 | Denis | A01G 13/0225 | 428/36.1 |
| 2003/0009936 A1 * | 1/2003 | Hodson | A01G 13/043 | 47/29.1 |
| 2007/0062171 A1 * | 3/2007 | Roberts | A01G 13/0237 | 56/339 |
| 2007/0186466 A1 * | 8/2007 | Gardiner | A01G 13/043 | 47/29.5 |
| 2007/0266625 A1 * | 11/2007 | Markis | A01G 13/10 | 47/31 |
| 2011/0113683 A1 * | 5/2011 | Morgan | A01G 13/0206 | 47/22.1 |
| 2012/0005952 A1 * | 1/2012 | Lohse | A01G 13/043 | 47/21.1 |
| 2013/0219783 A1 * | 8/2013 | Toye | A01G 13/043 | 47/31 |
| 2015/0272015 A1 * | 10/2015 | Sowinski | A01G 17/06 | 47/46 |
| 2017/0339849 A1 * | 11/2017 | Masri | A01G 13/0206 | |
| 2018/0160633 A1 * | 6/2018 | DeLao | A01G 13/0212 | |
| 2019/0357453 A1 * | 11/2019 | Fulton | A01G 13/043 | |
| 2020/0029507 A1 * | 1/2020 | Carlson | A01G 9/12 | |
| 2020/0113139 A1 * | 4/2020 | Carabelaian | A01G 13/0237 | |
| 2020/0128762 A1 * | 4/2020 | Fullerton | A01G 17/04 | |
| 2020/0253135 A1 * | 8/2020 | Thompson | A01G 13/0243 | |

FOREIGN PATENT DOCUMENTS

| | | | | |
|---|---|---|---|---|
| DE | 2453085 A1 * | 5/1976 | | A01G 13/043 |
| FR | 2381499 A1 * | 9/1978 | | A01G 13/043 |
| GB | 617074 A * | 2/1949 | | A01G 13/043 |

* cited by examiner

US 11,185,018 B2

VINEYARD FRUIT PROTECTION APPARATUS AND PROCESS

FIELD OF THE INVENTION

The present invention relates to vineyard fruit protection in general and, in particular, to a netting structure and process for protecting vine fruit such as grapes or the like from destruction by birds.

BACKGROUND

A chronic problem for farmers of grapes is protecting the fruit from being destroyed by birds. While larger vineyards can afford to simply grow enough fruit to accommodate the birds, smaller producers can suffer serious economic damage if grapes are left exposed to birds. Prior art bird protection netting systems simply drape netting over the vines which exposes a portion of fruit to the birds and poses other problems.

SUMMARY OF THE INVENTION

The present invention provides an inexpensive and easy to install netting system that prevents birds from having access to fruit on the vine while not restricting the growth and full maturation of the fruit. Furthermore, in one embodiment, the netting is maintained above the ground so as not to interfere with activities that require access to the ground beneath the vines. The netting comprises two sheets of netting attachable to each other along their upper and bottom borders which, when combined with rigid support members disposed at spaced-apart locations within the netting, form a netting tunnel that encapsulates the fruit of the vines.

In one embodiment, the protective netting system for vine fruit growing on vines having a trunk growing from the ground, a fruit zone spaced above the ground in which growing fruit is located, comprises a first netting wall having a first upper edge and a first bottom edge; a second netting wall having a second upper edge and a second bottom edge; wherein the first and second bottom edges are releasably secured together above the ground and below the fruit zone, and the first and second upper edges are releasably secured together above the fruit zone; and a plurality of rigid support members disposed between the first and second netting walls at spaced-apart locations create a netting tunnel that maintains the netting walls at a distance from the vine fruit.

DESCRIPTION OF THE DRAWINGS

The patent or application file contains at least one drawing executed as a color photograph. Copies of this patent or patent application publication with color drawings will be provided by the Office upon request and payment of the necessary fee.

FIG. 4 is a perspective view of a row of vines encapsulated by the netting invention.

DETAILED DESCRIPTION OF THE INVENTION

Figure 1:
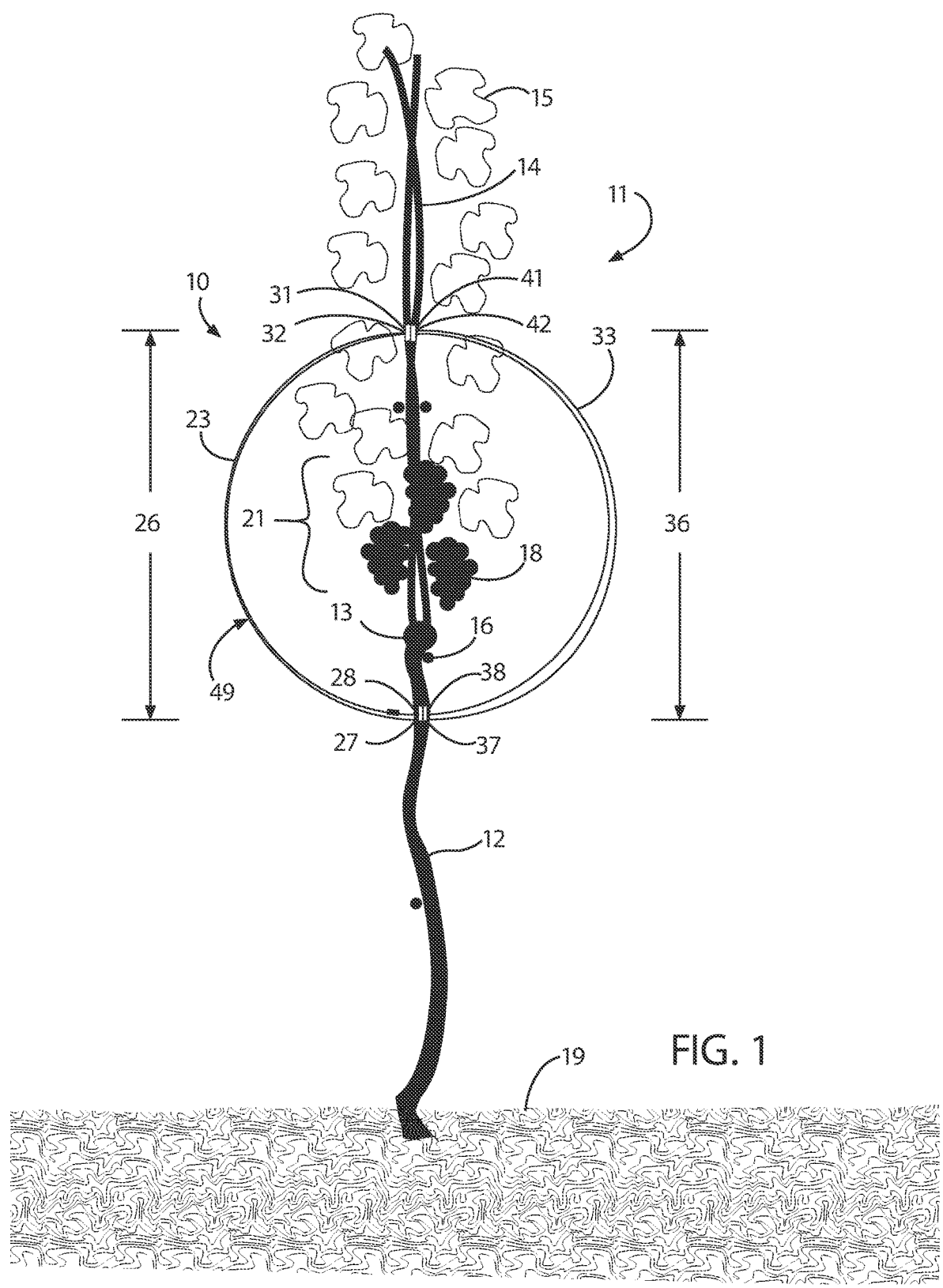
FIG. 1 is a side elevation view of the netting invention in relationship to growing vines.
Figure 2:
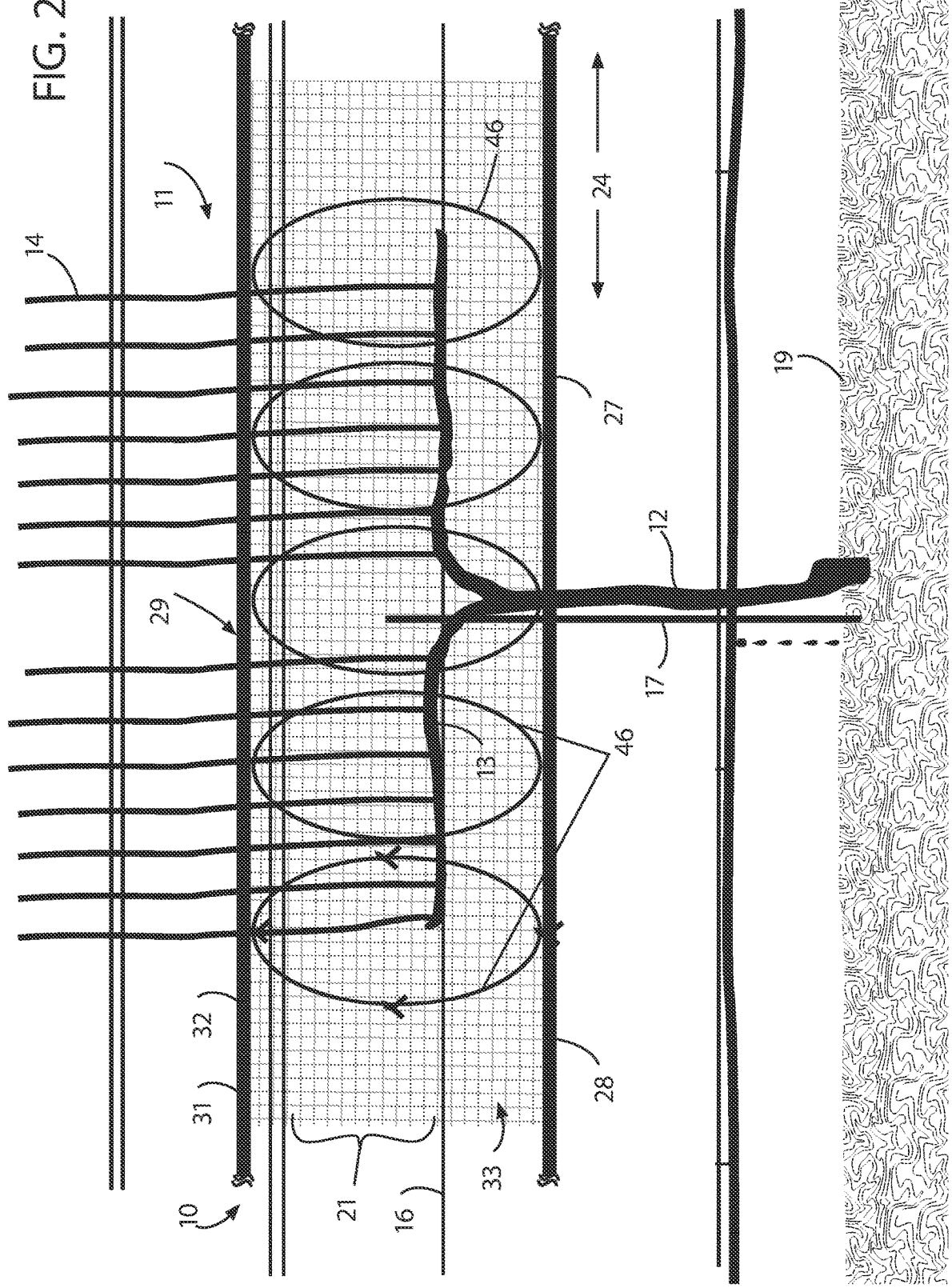
FIG. 2 is an end elevation.

Referring to FIGS. 1 and 2, a grape vine 11 has a vine trunk 12 that grows out of the ground 19, cordons 13, and shoots (canes) 14 having cane leaves 15. The cordons 13 are supported on a horizontal cordon wire 16 and the trunk 12 is supported by a grape stake 17 that is secured into the ground adjacent the vine trunk 12. Fruit 18 (FIG. 2, grapes for example) develops at the lower portions of the canes 14 adjacent the cordons 13 in a fruit zone 21. It is the fruit 18 in zone 21 that needs protection from birds (not shown).

The system 10 of the invention comprises a first netting wall 23 of commercially available netting having a length 24 of up to 50 feet or more and a width (height) 26 approximately equal to or greater than the fruiting zone 21. Added to the bottom edge 27 of the netting wall 23 is a closure mechanism 28 (which is not provided with commercially available netting), such as one element of a hook and loop closure mechanism (such as of a Velcro® strip) and the upper edge 31 of the netting wall 23 is likewise lined with a closure mechanism 32, such as one element of a hook and loop closure mechanism.

Referring to FIG. 2, system 10 further comprises a second netting wall 33 of commercially available netting that is substantially identical to the first netting wall 23 in that it has a length 34 of up to approximately 50 feet or more and a width (height) 36 approximately equal to or greater than the fruiting zone 21. Added to the bottom edge 37 of the netting wall 33 is a closure mechanism 38 (which is not provided with commercially available netting), such as one element of a hook and loop closure mechanism (such as of a Velcro® strip) and the upper edge 41 of the netting wall 33 is likewise lined with a closure mechanism 42, such as one element of a hook and loop closure mechanism.

Upper edges 31 of wall 23 and upper edge 41 of wall 33 have different elements of a hook and loop closure mechanism, whereby they can be releasably secured and easily secured, released and re-secured as needed.

Similarly, bottom edge 27 of wall 23 and bottom 37 of wall 33 have different elements of a hook and loop closure mechanism whereby they can be releasably secured together and easily secured, released and re-secured as needed. It will be understood by those skilled in the art that closure mechanisms other than hook and loop (Velcro®) exist (such as snaps, or zippers, etc.) and are within the scope of the invention.

When the upper edges 31 and 21 are secured together and the bottom edges 27 and 37 are secured together, the walls 23 and 33 form a tunnel 49 that encloses the fruit 18 in the fruit zone 21. However, without an internal support system, the netting walls 23 and 33 would drape themselves onto the fruit 18 which would be exposed to birds.

System 10 further comprises an internal support structure 29 that supports the netting walls at a distance from the fruit 18 sufficient to make them inaccessible to birds. The internal support structure comprises a plurality of rigid support members 46. In one embodiment, the rigid support members 46 are rings having a diameter sufficient to surround the fruit 18 in the fruit zone 21. Rings 47 are not restricted to a circular shape, as other shapes are capable of providing the same function.

Figure 3:
FIG. 3 is a perspective view of a vine encapsulated by the netting invention.

Referring to FIGS. 1, 2 and 3, the elements of system 10 that are assembled to form a protective netting tunnel (canopy) 49 comprise the netting walls 23 and 33 together with rigid support members 46. The lower edge 27 of first wall 23 is secured to lower edge 37 of second wall 33 and the upper edge 31 of the first wall 23 is secured to the upper edge 41 of second wall 33, encapsulating the fruit 18 (e.g., grapes) in fruit zone 21 in netting. The netting is maintained away from the fruit 18 and out of the reach of birds by rigid support members 46 secured within the netting walls 23 and 33 at spaced-apart locations along the length of the netting walls 23 and 33 and oriented to be generally perpendicular to the netting length. The rigid support members are sized to maintain the netting walls 23 and 33 away from the fruit 18 and out of the reach of birds.

The rigid support members are held in place by securing them to an upper edge(s) 31 and/or 41 and a bottom edge(s) 27 and/or 37 and to the netting itself at locations between the upper and lower edges. The rigid support members 46 can be secured in place by any number of securing devices 48 including simple twist ties, lengths of cord, or other known suitable securing devices.

The closure mechanisms 32 and 42 of the netting upper edges 31 and 41, respectively, are able to surround the shoots 14 and support them in a generally vertical orientation as best seen in FIGS. 1 and 2. This permits the shoot leaves 15 to have unimpaired access to sunlight outside of the net tunnel 49.

Referring to FIG. 4, a row 51 of a plurality of grape vines 11 are encapsulated by net walls 23 and 33 wherein the netting is disposed only about the fruit zone 21—above the ground 19 and below the canes 14, allowing the cane leaves 15 unfettered access to sunlight.

The advantages that accrue to the netting system 10 over net protective systems that simply drape the vines with netting which typically hangs on the fruit and extends to the ground include:
Ends most bird damage;
The netting is stretched and not merely draped to allow maximum sunlight;
Improves air circulation, helps to dry the leaves after a rain event;
Improves sunlight penetration to interior canopy within the tunnel;
Improves spray penetration;
Easy fruit sampling (the nets move with you to the clusters, or you can separate at the bottom and go underneath);
The canopy wafts in the wind, optimizing photosynthesis (not wadded up like draped nets);
Reduces fungal issues as shoots/canes are maintained upright;
Improves accessibility for mowing, weed control, unlike other nets that hang to the ground;
Forgiving of mixed varietal rows. Nets can be lifted for harvest and be secured back in place in a flash to continue to protect its neighbor.

In one embodiment, the process of installing the netting system 10 comprises:
Securing together the bottom edges 27 and 37 of netting walls 23 and 33 along a length of a row of vines 11 below the fruit zone and above the ground which joins the netting around the trunks 12 and any other structures that extend from the ground such as grape stakes 17 and other similar members.

Lifting up the netting walls 23 and 33 to encompass the fruiting zone and securing them together above the fruit zone 21 at their upper edges 31 and 41. As the upper edges 31 and 41 are secured together, rigid support members 46 are placed approximately every 2 to 3 feet (closer together or farther apart depending on the distribution of fruit 18 and the vines 11) where there is fruit 18.

The netting walls 23 and 33 are never left draped over fruit 18 as in the prior art. The two netting walls 23 and 33 are sealed underneath the fruiting zone 21 above the ground and brought up along the sides of the vines and secured along their upper edges, around the shoots/canes 14 which extend above the netting such that the canes and their leaves 15 are free to waft freely in the breezes. The leaves 15 of the shoots/canes 14 are the sugar factories that depend on sunlight to produce sugar. By not covering them, they enjoy full sunlight for full functioning. Covering them up so they are shaded from sunlight steals the sugar from the exterior leaves needed to survive.

In one embodiment of the process of the invention, the steps comprise:
disposing the first netting wall 23 having a first upper edge 31 and a first bottom edge 28 and a second netting wall 33 having a second upper edge 41 and a second bottom edge 37 along opposite sides of the row of vines 39;
securing together the first bottom edge 27 and the second bottom edge 37 below the fruit zone and above the ground 19;
lifting up the netting first netting wall 23 and second netting wall 33 to surround the fruit zone 21, and securing them together above the fruit zone 21 at their upper edges 31 and 41;
securing within netting walls 23 and 33 rigid supports members 46 at spaced apart locations along the row of vines 39 to maintain the netting walls 23 and 33 at a distance from the fruit 18.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, steps may be added or deleted to methods described within the scope of the present invention.

What is claimed is:

1. A protective netting system for the fruit zones of each vine of a row of multiple vines, where the row of multiple vines has a first side and a second side, and where each vine of the multiple vines has a trunk growing out of the ground and a fruit zone spaced above the ground, said protective netting system comprising;
a netting tunnel comprising;
a first netting wall, where the first netting wall is generally rectangular and has a first upper edge, a first bottom edge opposing the first upper edge, a first front edge, and a first rear edge opposing the first front edge;
a second netting wall, where the second netting wall is generally rectangular and has a second upper edge, a second bottom edge opposing the second upper edge, a second front edge, and a second rear edge opposing the second front edge;
an upper attachment mechanism releasably attaching the first upper edge of the first netting wall to the second upper edge of the second netting wall;
a lower attachment mechanism releasably attaching the first lower edge of the first netting wall to the second lower edge of the second netting wall; and
a plurality of rigid support rings disposed between the first and second netting walls at spaced-apart locations between front edges and the rear edges,
where the netting tunnel has a length extending from the first and second front edges to the first and second rear edges,
where, the netting tunnel is adapted to maintain a distance between the first and second netting walls and the vine fruit in the fruit zones of the row of multiple vines when the length of the netting tunnel is aligned to surround the fruit zones of the vines of the row of multiple vines, and where each vine of the row of multiple vines extends through the netting tunnel in a direction perpendicular to the length of the netting tunnel.

2. The protective netting system of claim 1 wherein the vines further include canes having leaves, such that the canes and their leaves extend above the netting tunnel.

3. The protective netting system of claim 1 wherein the trunk has a supporting grape stake in the ground and the where the first and second bottom edges are adapted to be releasably secured together around the trunk and the grape stake.

4. The protective netting system of claim 1 wherein the upper edges are releasably secured together by hook and loop fasteners, and the bottom edges are releasably secured together by hook and loop fasteners.

5. The protective netting system of claim 1 wherein the rigid support rings are secured within the first and second netting walls by securing the rigid support rings to the first upper edges and the second bottom edges and the netting therebetween.

\* \* \* \* \*